(12) United States Patent
Varvello et al.

(10) Patent No.: US 10,069,720 B2
(45) Date of Patent: Sep. 4, 2018

(54) ROUTING BY RESOLUTION

(75) Inventors: Matteo Varvello, Port Monmouth, NJ (US); Ghulam Memon, Eugene, OR (US); Ivica Rimac, Remseck (DE)

(73) Assignee: ALCATEL LUCENT, Paris (FR)

( * ) Notice: Subject to any disclaimer, the term of this patent is extended or adjusted under 35 U.S.C. 154(b) by 892 days.

(21) Appl. No.: 13/154,082

(22) Filed: Jun. 6, 2011

(65) Prior Publication Data

US 2012/0311073 A1    Dec. 6, 2012

(51) Int. Cl.
*G06F 15/16*    (2006.01)
*H04L 12/725*    (2013.01)
(Continued)

(52) U.S. Cl.
CPC .......... *H04L 45/306* (2013.01); *H04L 67/327* (2013.01); *H04L 29/1282* (2013.01);
(Continued)

(58) Field of Classification Search
CPC . H04L 67/28; H04L 63/0281; H04L 63/0407; H04L 61/106; H04L 63/0272;
(Continued)

(56) References Cited

U.S. PATENT DOCUMENTS 6,052,683 A *   4/2000  Irwin ........................... 707/758
7,315,541 B1 *  1/2008  Housel et al. ................. 370/392
(Continued)

FOREIGN PATENT DOCUMENTS

CN    1316696 A    10/2001
CN    1533088 A    9/2004
(Continued)

OTHER PUBLICATIONS

Teemu Koponen, Mohit Chawla, Byung-Gon Chun, Andrey Ermolinskiy, Kye Hyun Kim, Scott Shenker, Ion Stoica; A Data-Oriented (and Beyond) Network Architecture, ACM SIGCOMM Computer Communication Review, vol. 37 Issue 4, Oct. 2007, pp. 181-192. Abstract included.

(Continued)

*Primary Examiner* — Taylor Elfervig
(74) *Attorney, Agent, or Firm* — Kramer Amado, P.C.

(57) ABSTRACT

Various exemplary embodiments relate to a method and related network node including one or more of the following: receiving a request message, the request message including a pointer; determining whether the network node is associated with the pointer; and if the network node is associated with the pointer: determining a label associated with the pointer, modifying the request message to produce a modified message, the modified message including the label, and transmitting the modified message to at least one other network node. Various embodiments additionally or alternatively relate a method and related network node including one or more of the following receiving a publish message, wherein the publish message includes a pointer; generating a label to be associated with the pointer; modifying the publish message to produce a modified message, wherein the modified message includes the label; and transmitting the modified message to at least one other network node.

57 Claims, 7 Drawing Sheets

(51) Int. Cl.
| | |
|---|---|
| *H04L 29/08* | (2006.01) |
| *H04L 29/06* | (2006.01) |
| *H04L 29/12* | (2006.01) |
| *H04L 12/24* | (2006.01) |
| *H04L 12/741* | (2013.01) |
| *H04L 12/743* | (2013.01) |

(52) U.S. Cl.
CPC ........ *H04L 41/5058* (2013.01); *H04L 45/745* (2013.01); *H04L 45/7457* (2013.01); *H04L 61/106* (2013.01); *H04L 61/1541* (2013.01); *H04L 61/6013* (2013.01); *H04L 63/0272* (2013.01); *H04L 63/0281* (2013.01); *H04L 63/0407* (2013.01); *H04L 67/28* (2013.01)

(58) Field of Classification Search
CPC ............. H04L 29/1282; H04L 61/6013; H04L 41/5058; H04L 45/745; H04L 61/1541
USPC .................................................. 709/27, 226
See application file for complete search history.

(56) References Cited

U.S. PATENT DOCUMENTS

| | | | |
|---|---|---|---|
| 2003/0099237 A1 | 5/2003 | Mitra et al. | |
| 2005/0165957 A1* | 7/2005 | Choi et al. | 709/238 |
| 2006/0248195 A1* | 11/2006 | Toumura et al. | 709/226 |
| 2006/0294164 A1* | 12/2006 | Armangau et al. | 707/205 |
| 2009/0248893 A1 | 10/2009 | Richardson | |
| 2009/0279437 A1* | 11/2009 | Ransom et al. | 370/238 |
| 2010/0058027 A1* | 3/2010 | Gong et al. | 711/216 |

FOREIGN PATENT DOCUMENTS

| | | | | |
|---|---|---|---|---|
| CN | 101170425 A | 4/2008 | | |
| CN | 101820386 A | 9/2010 | | |
| EP | 2120402 A1 | 11/2009 | | |
| JP | 200631522 A | 2/2006 | | |
| JP | 2008294627 | 12/2008 | | |
| WO | WO 03/034669 | * | 4/2003 | ............. H04L 12/56 |

OTHER PUBLICATIONS

Mark Gritter, David R. Cheriton; An Architecture for Content Routing Support in the Internet; USITS'01 Proceeding of the 3rd conference on USENIX Symposium on Internet Technologies and Systems—vol. 3. Abstract included.

Van Jacobson, Diana K. Smetters, James D. Thornton, Michael F. Plass, Nicholas H. Briggs, Rebecca L. Braynard; Networking Named Content; Proceedings of the 5th international conference on Emerging networking experiments and technologies; pp. 1-12. Abstract included.

Jacobson Van et al. :Networking Named Content, COnext 09 Proceddings of the 5th International Conference on Emerging Networking Experiments and Technologies; Dec. 1-4, 2009; Rome, Italy, Association for Computing Machinery, New York, NY.

Barbir Nortel Networks B Cain Storigen Systems R Nair Consultant O Spatscheck AT&T A: "Known Content Network (CN) Request-Routing Mechanisms; rfc3568.txt", Jul. 1, 2003 Jul. 1, 2003 (Jul. 1, 2003).

International Search Report for PCT/US2012/038939 dated May 22, 2012.

Mark Gritter, David R. Cheriton; An Architecture for Content Routing Support in the Internet; USITS'01 Proceeding of the 3rd conference on USENIX Symposium on Internet Technologies and Systems—vol. 3. Abstract included, 2001.

Korean Office Action dated Sep. 1, 2014 for KR Application No. 2013-7032371, Sep. 1, 2014.

First Office Action for Japanese Application No. 2014-514480 dated Mar. 3, 2015.

Wang, et al., "Implementing Instant Messaging Using Named Data", Proceedings of the Sixth Asian Internet Engineering Conference (AINTEC '10), pp. 40-47, [online], ACM New York, Nov. 15, 2010, [viewed on Aug. 28, 2015], <URL:http://dl.acm.org/citation.cfm?id=1930292>.

"Chinese Office Action for CN Application No. 201280028007.3 dated Apr. 1, 2016".

\* cited by examiner

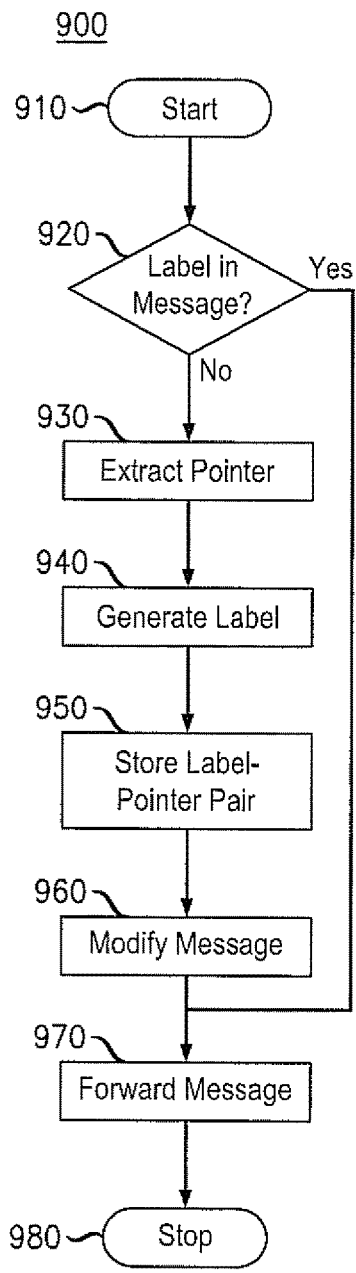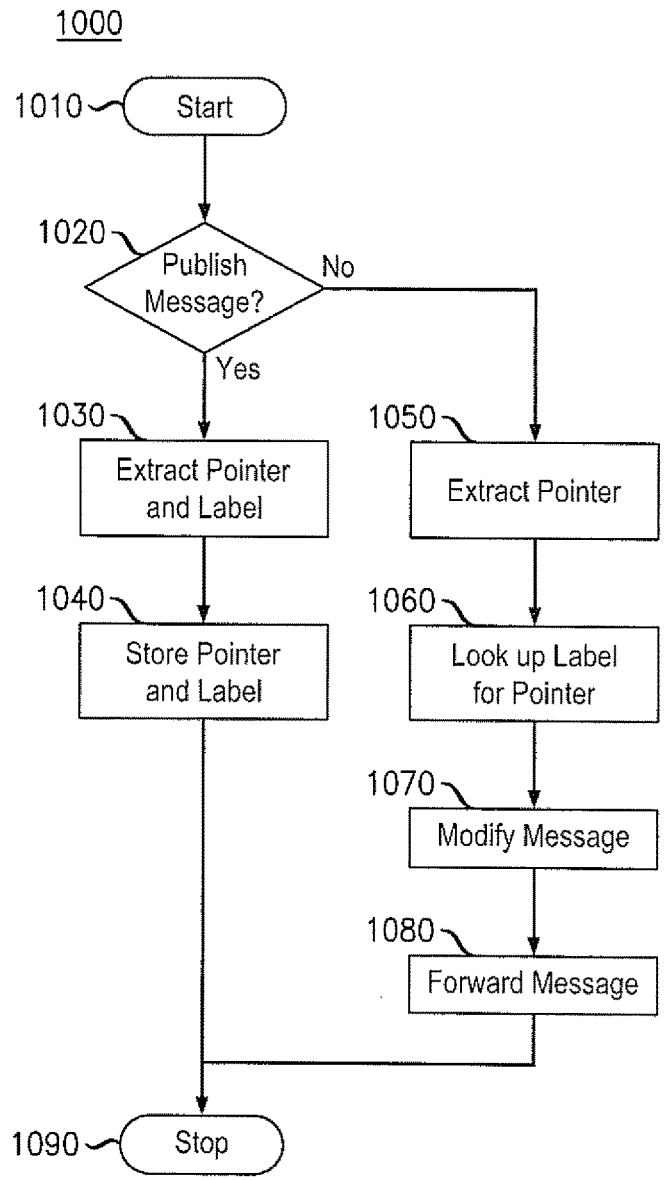
FIG. 9
FIG. 10

ROUTING BY RESOLUTION

STATEMENT OF GOVERNMENT INTEREST

The present invention was made with government assistance under National Science Foundation (NSF) Grant No. CNS-0831734 awarded by the NSF. The government has certain rights in this invention.

TECHNICAL FIELD

Various exemplary embodiments disclosed herein relate generally to network routing.

BACKGROUND

Since its creation, the Internet has gradually expanded from a system for allowing general computer-to-computer communication to a facility for providing a myriad of services and content to users around the globe. As part of this evolution, sophisticated infrastructure was added over time to better support services and content-centric applications.

Today, the Domain Name System (DNS) serves as a directory service for determining the location of requested content. Various hosts establish "domain names" as aliases with the DNS. Users then contact various DNS servers to retrieve the address of the host, as identified by a domain name, where requested content is stored and served. Subsequently, users contact the host via the retrieved address in order to fetch or consume the content.

SUMMARY

Various exemplary embodiments relate to a machine-readable storage medium encoded with instructions for requesting content in a network by a computer, the machine-readable storage medium including one or more of the following: instructions for determining a content item to request; instructions for determining a pointer associated with the content item; instructions for generating a request message including the pointer; instructions for transmitting the request message to at least one network node; and instructions for receiving the content item from at least one network node.

Various alternative embodiments are described wherein the instructions for determining a pointer associated with the content item include instructions for generating a pointer based on the content item. Various alternative embodiments are described wherein the instructions for generating a pointer based on the content item include instructions for generating a hash value based on the content item. Various alternative embodiments are described wherein the instructions for generating a hash value based on the content item include instructions for generating a hash value based on a name of the content item. Various alternative embodiments are described wherein the instructions for generating a request message including the pointer include instructions for inserting the pointer into the message as a destination address.

Various exemplary embodiments relate to a machine-readable storage medium encoded with instructions for publishing content in a network by a computer, the machine-readable storage medium including one or more of the following: instructions for determining a content item to publish; instructions for generating a pointer based on the content item; instructions for generating a publish message including the pointer; and instructions for transmitting the publish message to at least one network node.

Various alternative embodiments additionally include one or more of the following: instructions for receiving a request message from at least one network node, the request message including the pointer and indicating a requesting device; instructions for determining that the pointer is associated with the content item; and instructions for transmitting the content item to the requesting device.

Various alternative embodiments are described wherein the pointer is included in an address field of the request message. Various alternative embodiments are described wherein the instructions for generating a pointer based on the content item include instructions for generating a hash value based on the content item. Various alternative embodiments are described wherein the instructions for generating a hash value based on the content item include instructions for generating a hash value based on a name of the content item.

Various exemplary embodiments relate to a method for routing content requests in a network by a network node, the method including one or more of the following: receiving, at the network node, a request message, the request message including a pointer; determining whether the network node is associated with the pointer; and if the network node is associated with the pointer: determining a label associated with the pointer, modifying the request message to produce a modified message, the modified message including the label, and transmitting the modified message to at least one other network node.

Various exemplary embodiments relate to a resolution system for routing content requests in a network, the resolution system including one or more of the following: a routing table for storing routing information; a correlation storage for storing a plurality of correlation records, wherein each correlation record identifies a pointer and at least one label; a receiver interface for receiving a request message, the request message including a requested pointer; a transmitter interface for transmitting messages; a search message modifier for: locating a correlation record that identifies the requested pointer, selecting a selected label of the at least one label identified by the correlation record, and modifying the request message to produce a modified message, the modified message including the selected label; and a message router for: determining, based on the routing information and the modified message, a network node, and forwarding the modified message to the network node via the transmitter interface.

Various exemplary embodiments relate to a machine-readable storage medium encoded with instructions for routing content requests in a network by a network node, the machine-readable storage medium including one or more of the following: instructions for receiving, at the network node, a request message, the request message including a pointer; instructions for determining whether the network node is associated with the pointer; and instructions for, if the network node is associated with the pointer: determining a label associated with the pointer, modifying the request message to produce a modified message, the modified message including the label, and transmitting the modified message to at least one other network node.

Various alternative embodiments are described wherein the step of determining whether the network node is associated with the pointer includes one or more of the following: determining a prefix associated with the network node; and determining whether the prefix matches at least a portion of the pointer. Various alternative embodiments are described wherein the step of determining whether the network node is associated with the pointer further includes determining whether the prefix is a longest matching prefix for the pointer in the network. Various alternative embodiments are described wherein the pointer is included in an address field of the request message and the label is included in an address field of the modified message. Various alternative embodiments are described wherein at least one of the request message and the modified message is a network-layer packet. Various alternative embodiments are described wherein the step of transmitting the modified message to at least one other network node includes transmitting the modified message toward a different node associated with a different prefix, wherein the different prefix matches at least a portion of the label. Various alternative embodiments are described wherein the pointer is associated with a plurality of labels; and the step of determining a label associated with the pointer includes selecting a label of the plurality of labels. Various alternative embodiments are described wherein the pointer is a hash of a name for a content item.

Various alternative embodiments include one or more of the following: receiving, at the network node, a publication message, the publication message including a pointer and a label;
    extracting the pointer and the label from the publication message; and retaining the pointer and the label together in memory; wherein the step of determining a label associated with the pointer includes reading the pointer and label from memory.

Various exemplary embodiments relate to a method for publishing content in a network by a network node, the method including one or more of the following: receiving, at the network node, a publish message, wherein the publish message includes a pointer; generating a label to be associated with the pointer; modifying the publish message to produce a modified message, wherein the modified message includes the label; and transmitting the modified message to at least one other network node.

Various exemplary embodiments relate to a publication system for publishing content in a network, the publication system including one or more of the following: a routing table for storing routing information; a receiver interface for receiving a publish message, the publish message including a pointer; a transmitter interface for transmitting messages; a label calculator for generating a label for association with the pointer; a publish message modifier for modifying the publish message to produce a modified message, wherein the modified message includes the label; and a message router for: determining, based on the routing information and the modified message, a network node; and forwarding the modified message to the network node via the transmitter interface.

Various exemplary embodiments relate to a machine-readable storage medium encoded with instructions for publishing content in a network by a network node, the machine-readable storage medium including one or more of the following: instructions for receiving, at the network node, a publish message, wherein the publish message includes a pointer; instructions for generating a label to be associated with the pointer; instructions for modifying the publish message to produce a modified message, wherein the modified message includes the label; and instructions for transmitting the modified message to at least one other network node.

Various alternative embodiments are described wherein the step of generating a label to be associated with the pointer includes one or more of the following: determining a prefix associated with the network node; and including at least a portion of the pointer and at least a portion of the prefix in the label. Various alternative embodiments are described wherein the pointer is included in an address field of at least one of the publish message and the modified message. Various alternative embodiments are described wherein the step of transmitting the modified message to at least one other network node includes selecting the at least one other network node based on the pointer. Various alternative embodiments are described wherein the step of selecting the at least one other network node based on the pointer includes one or more of the following: determining a prefix associated with the at least one other node; and determining that the prefix matches at least a portion of the pointer. Various alternative embodiments are described wherein the pointer is a hash of a name for a content item. Various alternative embodiments are described wherein at least one of the publish message and the modified message are network layer packets.

BRIEF DESCRIPTION OF THE DRAWINGS

In order to better understand various exemplary embodiments, reference is made to the accompanying drawings, wherein:
FIG. 9 illustrates an exemplary method for processing and transmitting publish messages;
and
    FIG. 10 illustrates an exemplary method for processing received publish messages and resolving search messages.

DETAILED DESCRIPTION

Figure 1:
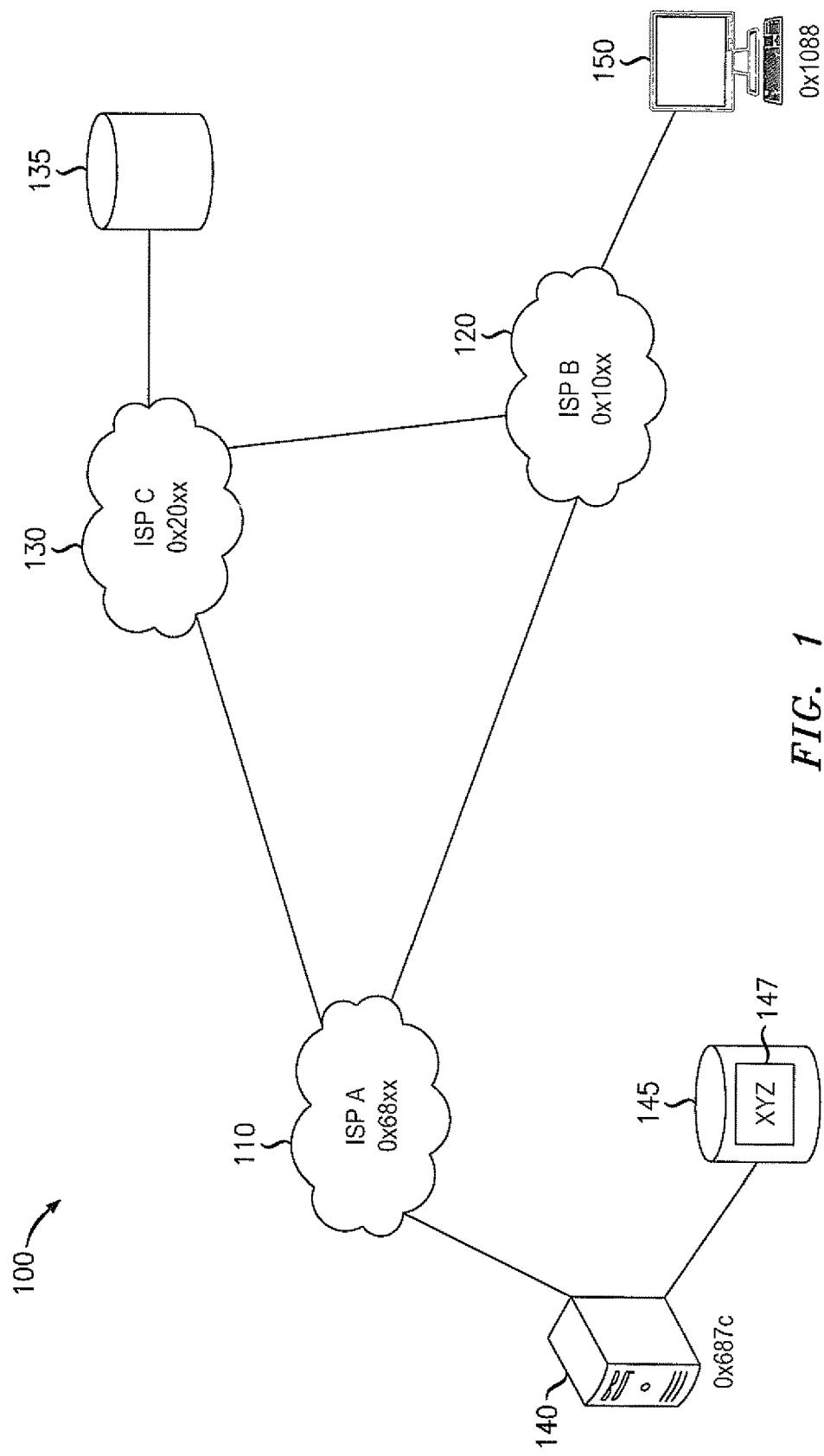
FIG. 1 illustrates an exemplary network for distributing content.

The usage of Domain Name System (DNS) servers makes replication and moving of data inconvenient; if content is to be accessed at a different host, either a different domain name must be communicated to the user or DNS records must be updated to point, instead, to the new host. Various additional limitations are inherent in the DNS paradigm.

Content-centric networking (CCN), on the other hand, solves may of the problems in the DNS paradigm. Under the CCN paradigm, content may be requested from a network based on its name. CCN, however, poses a number of issues that must be addressed to enable a practical application. For example, the CCN paradigm often suffers from poor scalability. Accordingly, there is a need for a scalable system wherein content may be requested by its name or other defining characteristic, rather than by the host on which it resides.

Referring now to the drawings, in which like numerals refer to like components or steps, there are disclosed broad aspects of various exemplary embodiments.

FIG. 1 illustrates an exemplary network 100 for distributing content. For example, network 100 may be a packet-switched network of computers such as the Internet. As such, network 100 may include multiple Internet service providers (ISPs) such as ISP A 110, ISP B 120, and ISP C. Network 100 may also include a number of content servers such as server 140 and end-user systems such as system 150.

ISPs 110, 120, 130 may include one or more devices for routing messages in network 100. Further, ISPs 110, 120, 130 may be in communication with each other, either directly or through one or more intermediate nodes. It should be apparent that the organization of network 100 is a simplified example and that network 100 may include numerous additional ISPs (not shown). Further, the connections shown are exemplary; other topologies are possible. For example, ISP A 110 and ISP B 120 may only be in communication via ISP C 130.

One or more devices within an ISP 110, 120, 130 may have access to one or more storage devices, such as storage device 135. Storage device 135 may include a machine-readable storage medium such as read-only memory (ROM), random-access memory (RAM), magnetic disk storage media, optical storage media, flash-memory devices, and/or similar storage media. The operation of storage device 135 will be described in further detail below with respect to FIGS. 2-4.

Server 140 may be a device adapted to receive requests for content and subsequently transfer requested content to the requesting device. Accordingly, server 140 may be a personal computer, laptop, tablet, server, blade, mobile phone, and/or any other device that may serve content over a network.

Server 140 may include or otherwise have access to a storage device 145. Storage device 145 may include a machine-readable storage medium such as read-only memory (ROM), random-access memory (RAM), magnetic disk storage media, optical storage media, flash-memory devices, and/or similar storage media. Storage device 145 may store one or more content items, such as content item 147. Content item 147 may be any data such as, for example, a text file, an html file, an audio file, a video file, etc.

Device 150 may be a device adapted to request and receive content items from network 100. Accordingly, device 150 may be a personal computer, laptop, tablet, server, blade, mobile phone, and/or any other device that may consume content over a network.

Each ISP may be associated with one or more address prefixes, each prefix indicating a portion of the device addresses of one or more devices attached to the ISP. For example, ISP A 110 is associated with address prefix 0x68xx. Thus, one or more devices attached to ISP A may carry an address that begins with 0x68. As an example, the address of server 140 is 0x687c; the address 0x687c carries the prefix 0x68xx. Likewise, device 150 has address 0x1088, which matches the 0x10xx prefix of ISP B 120, to which device 150 is attached. Further, ISP C 130 may connect to one or more devices that match the 0x20xx prefix, which is associated with ISP C 130.

Having described the components of subscriber network 100, the operation of network 100 will now be described with reference to FIGS. 2-4.

Figure 2:
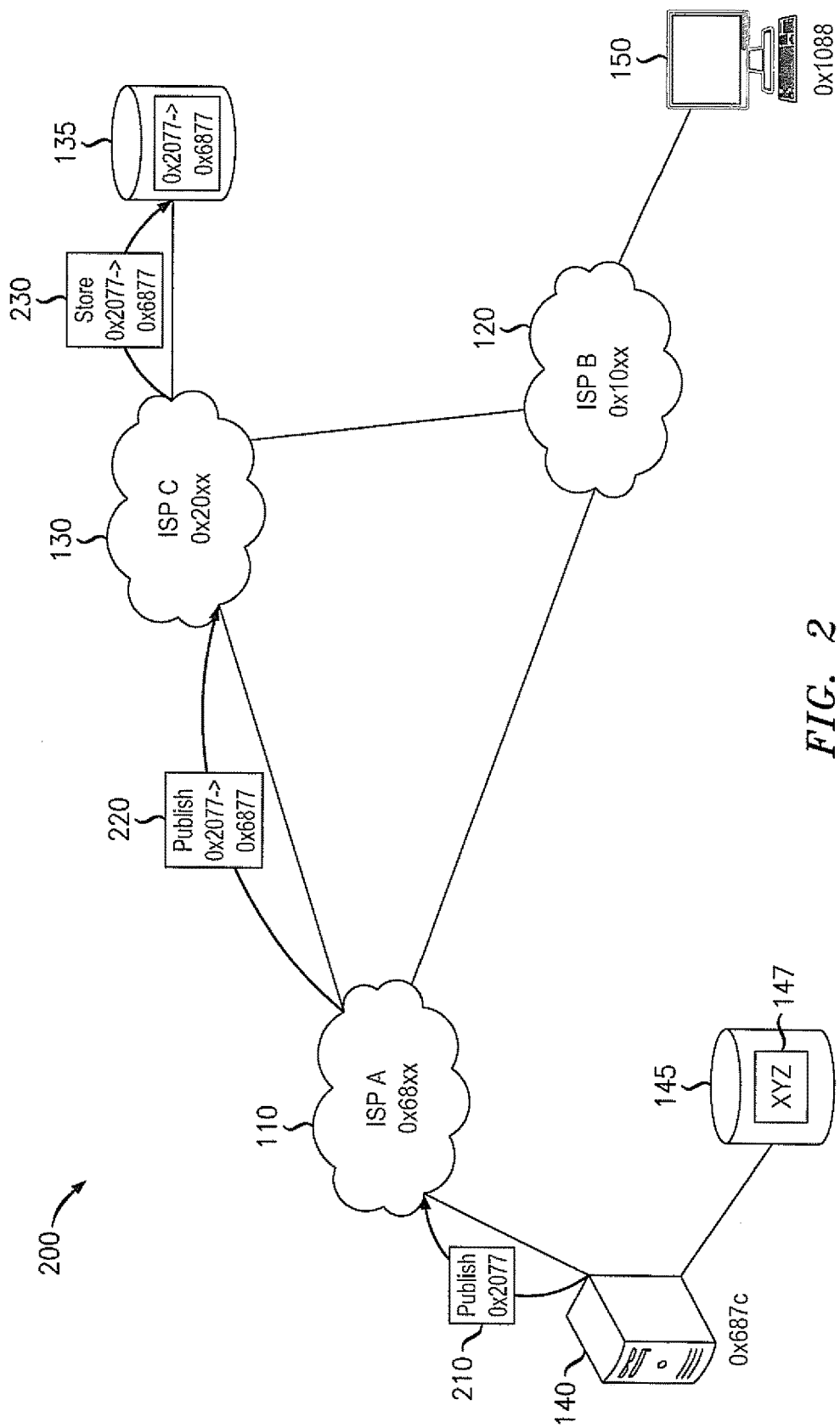
FIG. 2 illustrates an exemplary message exchange for publishing content.

FIG. 2 illustrates an exemplary message 200 exchange for publishing content. Server 140 may begin by determining that it should publish content item 147. For example, a user may indicate that content item 147 should be made available over network 100. Server may then proceed to calculate a "pointer" for content item 147. As used herein, the term pointer refers to a persistent identifier for a content item that is not based on the location of the content item. In various embodiments, server 140 may perform a hash function on the name or other characteristic of the content item 145 to generate a pointer. For example, server may process the name "XYZ" of content item 147 using the SHA-1 algorithm to produce a hash value "0x2077."

Server 140 may proceed by constructing a "publish message." As used herein, a publish message may be any message for transmission to another device that indicates a desire to publish an identified content item. According to various embodiments, a publish message may be implemented as a network-layer (or "layer 3") packet including a header that identifies the packet as a publish message. Server 140 may construct publish message 210, including the pointer "0x2077." In various embodiments, the pointer may be included in a destination address field and/or special pointer field of the packet header. After publish message 210 is constructed, server 140 may forward publish message 210 to ISP A 110 for further processing.

Upon receiving publish message 210, ISP A 110 (or a device therein) may identify publish message 210 as a request to publish data. ISP A 110 may then calculate a "label" for the data. As used herein, the term label refers to a location-dependent identifier for a content item. In various embodiments, ISP A 110 may generate a label based on the pointer of the content item and the address prefix of the ISP 110. For example, ISP A 110 may simply replace a number of high-order bits in the pointer with its own prefix. Thus, ISP A 110 may generate a label "0x6877" based on the high order bits of its prefix ("0x68xx") and the remaining bits of the pointer ("0x2077").

After generating a label for the content item, ISP A 110 may modify publish message 210 to include the label. For example, ISP A 110 may insert the label into a special label field of the packet header. ISP A 110 may then route publish message 220 based on the pointer. In various embodiments, using a routing table or similar data structure, ISP A 110 may locate a next hop based on the longest known prefix match for the pointer, "0x2077." For example, ISP A 110 may determine that ISP C 130 is the longest known prefix match for pointer "0x2077." As such, ISP A 110 may forward publish message 220 to ISP C 130.

In various alternative embodiments, server 140 may instead generate the pointer and the label. Server 140 may generate the label in a similar manner as described in connection with ISP A 110, based on a prefix of server 140 and/or ISP A 110. In these embodiments, ISP A 110 may simply forward the publish message toward ISP C 130. Various additional modifications to the components and operation exemplary network 100 will be apparent to those of skill in the art for enabling server 140 to calculate a pointer.

Upon receiving publish message 220, ISP C 130 (or a device therein) may determine that it is the longest prefix match for pointer "0x2077." For example, ISP C 130 may determine that no other known devices are associated with a longer matching prefix. As such, ISP C 130 may be deemed to be the resolver for content item 147. ISP C 130 may then store 230 the correlation between the pointer and label in a storage device 135. At this point, content item 147 has been published and may be requested by other devices participating in network 100.

Figure 3:
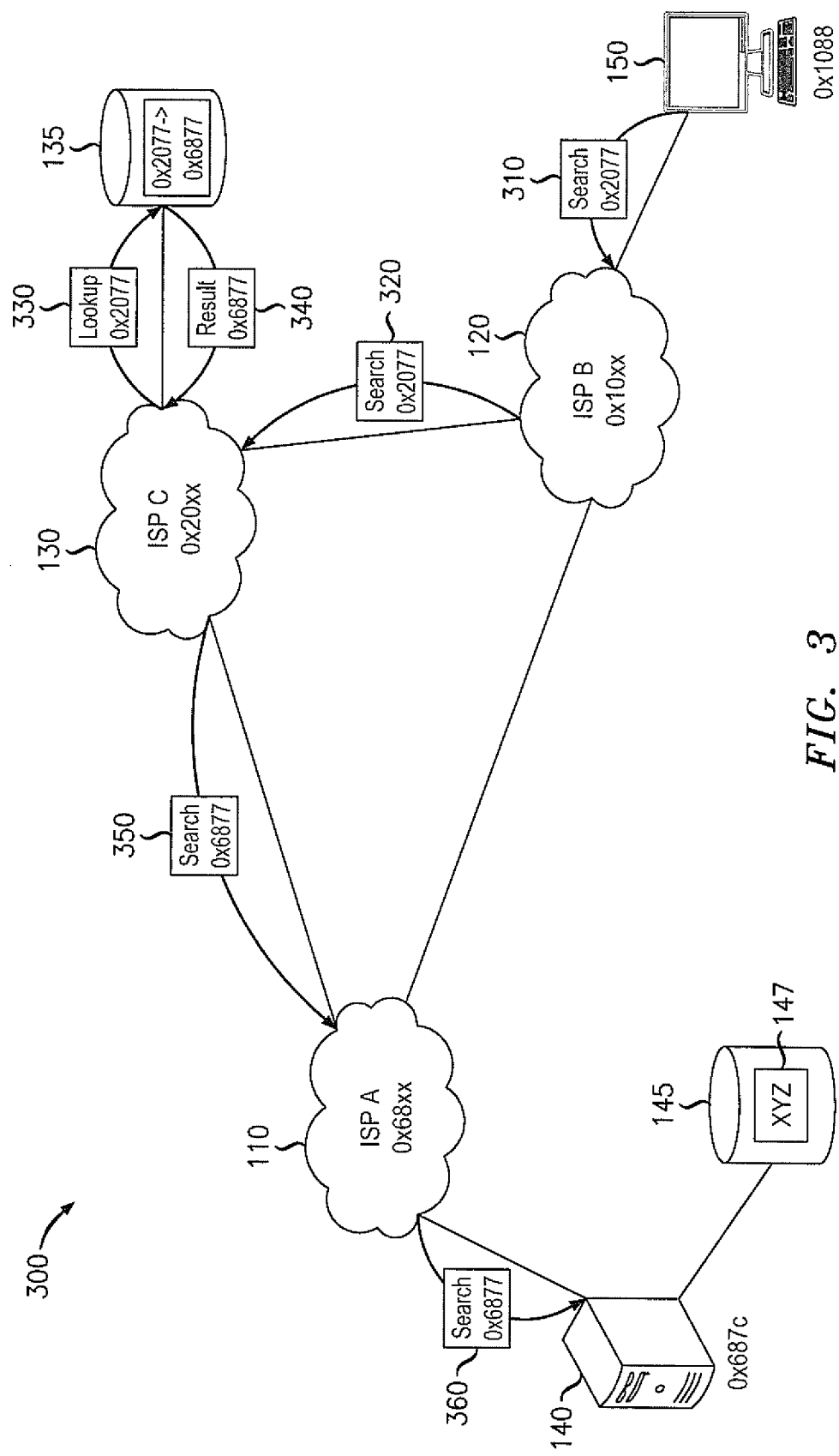
FIG. 3 illustrates an exemplary message exchange for requesting content.

FIG. 3 illustrates an exemplary message exchange 300 for requesting content. At some point after content item 147 has been published, device 150 may determine that it should request content item 147. For example, a user may indicate that a particular file should be downloaded. Device 150 may begin by determining the pointer for the content item 147. In various embodiments, the pointer may be provided to device 150 by, for example, a web page or another device (not shown). In various embodiments, device 150 may, additionally or alternatively, compute the pointer. For example, device 150 may process the name "XYZ" of content item 147 using the SHA-1 algorithm to produce a hash value "0x2077," which is the pointer for content item 147.

Device 150 proceeds by generating a "search message." As used herein, a search message may be any message for transmission to another device that indicates a desire to receive an identified content item. According to various embodiments, a search message may be implemented as a network-layer (or "layer 3") packet including a header that identifies the packet as a search message. Device 150 constructs search message 310, including the pointer "0x2077." In various embodiments, the pointer may be included in a destination address field and/or special pointer field of the packet header. After search message 310 is constructed, device 150 may forward search message 310 to ISP A 110 for further processing.

Upon receiving search message 310, ISP B 120 (or a device therein) may determine that it is a search message and should be routed to the device associated with the longest prefix match for the pointer. In various embodiments, using a routing table or similar data structure, ISP B 120 may locate a next hop based on the longest known prefix match for the pointer, "0x2077." For example, ISP B 120 may determine that ISP C 130 is the longest know prefix match for pointer "0x2077." As such, ISP B 120 may forward search message 320 to ISP C 130.

Upon receiving search message 320, ISP C 130 (or a device therein) may determine that it is the longest prefix match for pointer "0x2077." For example, ISP C 130 may determine that no other known devices are associated with a longer matching prefix. As such, ISP C 130 is the resolver for pointer "0x2077." ISP C 130 looks up 330 pointer "0x2077" in storage device 135 and retrieves a result 340 indicating that label "0x6877" should be used. Subsequently, ISP C 130 modifies search message 320 to include the label. For example, ISP C 110 may insert the label into a special label field of the packet header and/or replace the pointer (if present) in an address field. ISP C 130 may then forward search message 350, this time based on the label instead of the pointer. Accordingly, ISP C 130 may determine that ISP A 110 is the longest known prefix match for label "0x6877" and forward search message 350 accordingly.

Upon receiving search message 350, ISP A 110 (or a device therein) may forward the search message 360 to server 140, again based on the longest known prefix match with the pointer. Alternatively, ISP A 110 may store a correspondence between server 140 and the pointer "0x6877" and/or the label "0x2077." In such case, ISP A 110 may forward the message based on this correspondence, rather than a longest prefix match of the label. In various embodiments, server 140 may have no knowledge of the label for content item 147. In these embodiments, ISP A 110 may remove the label from search message 360 before forwarding it to server 140.

Once server 140 receives search message 360, server 140 may process message 360 and deliver the requested content item 145.

Figure 4:
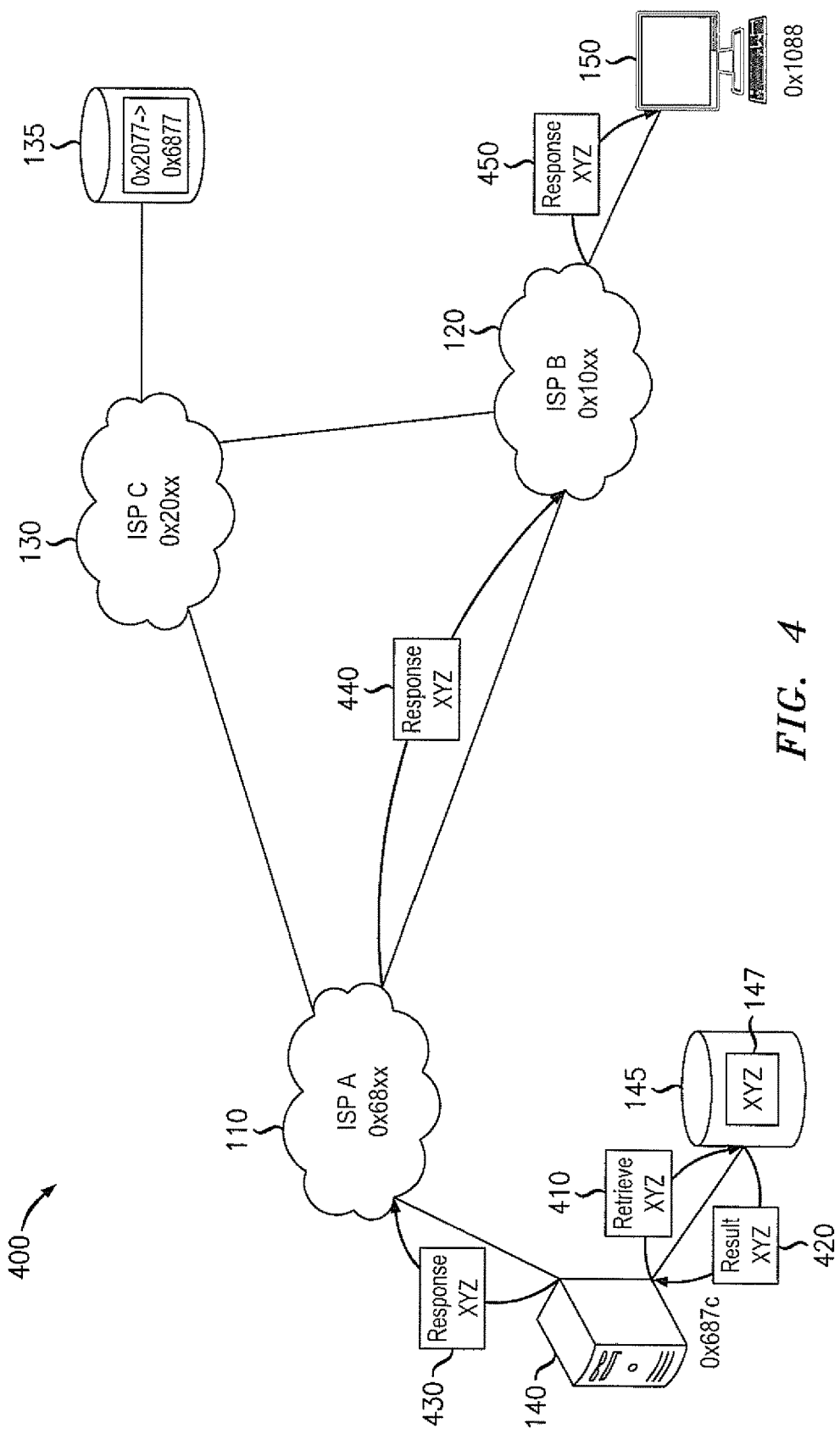
FIG. 4 illustrates an exemplary message exchange for delivering content.

FIG. 4 illustrates an exemplary message exchange 400 for delivering content. After server 140 receives a request for a content item, such as message 360, server 140 may identify the requested file, for example, by using a file name, pointer, or label included in the request message. In the case of a pointer, server 140 may store a correspondence between pointers and content items that it has previously published. In the case of a label, server 140 may use the low order bits (for example, the bits that were not changed by ISP A 110), to identify the requested content item. Regardless of the method used, server 140 retrieves 410 content item 147 from storage 145.

After server 140 receives 420 the content item 147, server 140 may construct a "response message" 430 for delivering content item 147 to device 150. As used herein, a response message may be any message for transmission to another device that includes a requested content item. According to various embodiments, a search message may be implemented as a network-layer (or "layer 3") packet including a header that identifies the packet as a response message. Response message 430 may include the address of requesting device 150, or "0x1088." Such address may have been included in the request message. Once response message 430 is constructed, server 140 may transmit the message 430 to ISP A 110.

Upon receiving message 430, ISP A 110 (or a device therein) may determine that message is a response message and should be routed to the device associated with the longest prefix match for the pointer. In various embodiments, using a routing table or similar data structure, ISP A 110 may locate a next hop based on the longest known prefix match for the address, "0x1088." For example, ISP A 110 may determine that ISP B 120 is the longest know prefix match for address "0x1088." As such, ISP A 110 may forward response message 440 to ISP B 120.

Likewise, upon receiving message 440, ISP B 120 (or a device therein) may determine that message is a response message and should be routed to the device associated with the longest prefix match for the pointer. Accordingly, ISP B 120 may forward response message 450 to device 150. Thereafter, device 150 may extract the content item 147 from response 450 and display or otherwise use the content item 147.

It should be apparent that while the examples herein describe functions performed by an ISP, these functions may be performed by one or more computers and/or other devices under control or otherwise associated with the ISP. Further, various organizations may be utilized within each ISP to provide such functions. For example, pointers and/or labels may be stored at one or more border routers of an ISP, in a centralized database of the ISP, and/or in a distributed hash table formed by internal routers. The details of such implementations will be apparent to those of skill in the art.

It should also be apparent that while the ISPs 110, 120, 130 of network 100 are each described as performing particular functions, that in various embodiments each of the ISPs may also perform functions described in connection with other ISPs 110, 120, 130. For example, ISP A 110 may additionally act as a resolver for pointers matching prefix "0x68xx" or ISP B 120 may additionally act as a publisher for content items published by device 150. In various embodiments, each ISP 110, 120, 130 may be capable of performing any of the functions described herein.

Figure 5:
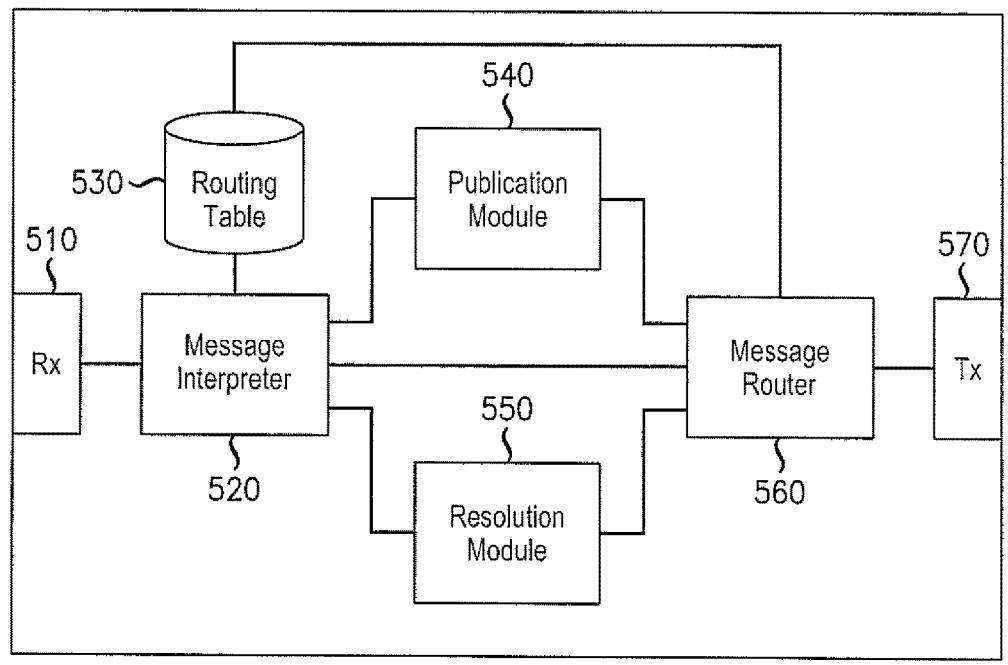
FIG. 5 illustrates an exemplary network node for processing content-routed messages.

FIG. 5 illustrates an exemplary network node 500 for processing content-routed messages. Node 500 may correspond to an ISP such as ISPs 110, 120, 130 or one or more nodes thereof. In various embodiments node 500 may be a router or other network device. Node 500 may include receiver 510, message interpreter 520, routing table 530, publication module 540, resolution module 550, message router 560, and transmitter 570.

Receiver 510 may be an interface comprising hardware and/or executable instructions encoded on a machine-readable storage medium configured to receive messages from other nodes. For example, receiver 510 may be a network interface or part of a network interface such as, for example an Ethernet and/or WiFi interface. Such other nodes may include devices similar to node 500. Further, while receiver 510 is depicted as a single component of node 500, it should be understood that node 500 may include a number of interfaces for receiving messages from a plurality of different devices.

Message interpreter 520 may include hardware and/or executable instructions on a machine-readable storage medium configured to receive a message via receiver 510 and interpret the contents of the message. First, message interpreter 520 may determine whether node 500 is a recipient of the message. Message interpreter 520 may examine a recipient for the message or determine, using routing table 530, whether node 500 is the longest prefix match for a pointer or label included in the message. For example, if the message includes pointer "0x2077" in an address field or otherwise indicates that the message should be routed based on pointer "0x2077," message interpreter may refer to routing table 530 and determine that another node has a longer prefix match for the pointer.

In the case where a longer prefix match for the message is known to node 500, message interpreter 520 may further determine whether the massage is a publish message or another message by, for example, examining an appropriate header field for the message. If the message is a publish message, message interpreter 520 may pass the message to publication module 540 for further processing. Otherwise, message interpreter 520 may pass the message directly to message router 560 so that it may be forwarded to an appropriate node. If, on the other hand, message interpreter 520 determines that node 500 is the longest prefix match for the message, message interpreter 520 may pass the message to resolution module 550 for further processing.

Routing table 530 may be any machine-readable medium capable of storing data related to the routing of messages. Accordingly, routing table 530 may include a machine-readable storage medium such as read-only memory (ROM), random-access memory (RAM), magnetic disk storage media, optical storage media, flash-memory devices, and/or similar storage media. In various embodiments, routing table may include a number of prefixes and associated next hop devices or ports.

Publication module 540 may include hardware and/or executable instructions on a machine-readable storage medium configured to perform publication operations on a publish message when appropriate. For example, publication module 540 may calculate a label for a published content item, insert the label into the publish message, and forward the modified message. An exemplary publication module is described in greater detail below with respect to FIG. 6.

Resolution module 550 may include hardware and/or executable instructions on a machine-readable storage medium configured to store correlations between pointers and labels and to reroute appropriate search messages based on the stored correlations. An exemplary resolution module is described in greater detail below with respect to FIG. 7.

Message router 560 may include hardware and/or executable instructions on a machine-readable storage medium configured to determine an appropriate next hop for various messages and transmit these messages via transmitter 570, accordingly. Thus, message router may examine an address field of each message or, in various embodiments, a pointer or label field if the packet indicates that it should be routed based on one of these values. Message router 560 may then determine a next hop for each message based on routing table 530. For example, in various embodiments, message router 560 may read routing table 530 to determine a next hop that is the longest known prefix match for the address, label, and/or pointer being used to route the message. Finally, message router 560 may forward the message to the appropriate next hop via transmitter 570.

Transmitter 570 may be an interface comprising hardware and/or executable instructions encoded on a machine-readable storage medium configured to transmit messages from other nodes. For example, transmitter 570 may be a network interface or part of a network interface such as, for example an Ethernet and/or WiFi interface. Such other nodes may include devices similar to node 500. Further, while receiver 510 is depicted as a single component of node 500, it should be understood that node 500 may include a number of interfaces for transmitting messages from a plurality of different devices. It should further be understood that receiver 510 and transmitter 570 may be part of the same interface device.

Figure 6:
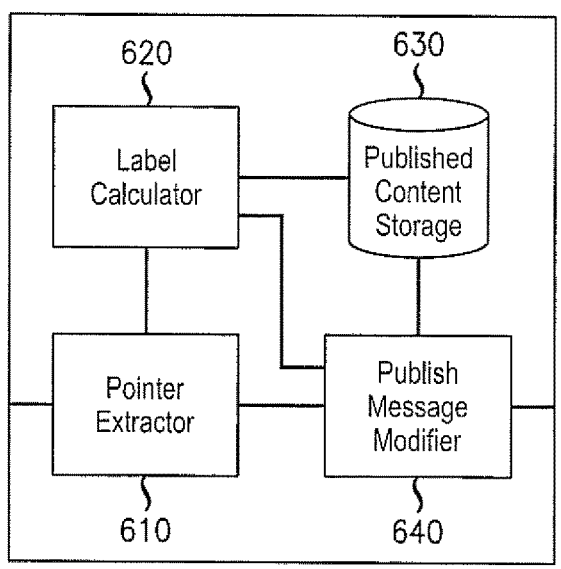
FIG. 6 illustrates an exemplary system for processing and transmitting publish messages.

FIG. 6 illustrates an exemplary system 600 for processing and transmitting publish messages. System 600 may correspond to publication module 540 of node 500, may be deployed within a different node, or may be deployed as an independent node. System 600 may include pointer extractor 610, label calculator 620, published content storage 630, and publish message modifier 640.

Pointer extractor 610 may include hardware and/or executable instructions on a machine-readable storage medium configured to extract a pointer from a publish message. Such pointer may be located in a special pointer field or other field of the message. Pointer extractor 610 may receive such a publish message from another device or from another component of the node in which system 600 is deployed. In various embodiments wherein system 600 corresponds to publication module 540 of node 500, pointer extractor 610 may receive a publish message from message interpreter 520.

Label calculator 620 may include hardware and/or executable instructions on a machine-readable storage medium configured to determine a label to be used in association with the pointer located by pointer extractor 610. For example, label calculator may generate a label based on the pointer and a prefix associated with the system 600 and/or a node in which system 600 is deployed. In various embodiments, label calculator may generate a label by replacing the high order bits of the pointer with the appropriate prefix. As such, the label may be used later to locate system 600 and/or a node in which system 600 is deployed. In various embodiments, label calculator may store the label, pointer, and/or publishing device together in published content storage for later use.

Published content storage 630 may be any machine-readable medium capable of storing associations between labels, pointers, and/or publishing devices. Accordingly, published content storage 630 may include a machine-readable storage medium such as read-only memory (ROM), random-access memory (RAM), magnetic disk storage media, optical storage media, flash-memory devices, and/or similar storage media.

Publish message modifier 640 may include hardware and/or executable instructions on a machine-readable storage medium configured to insert a label into a publish message. For example, publish message modifier 640 may insert the label generated by label calculator 620 into a special label field in the message header. After modifying the message, publish message modifier 640 may forward the message to another device or to another component within a node in which system 600 is deployed. In various embodiments wherein system 600 corresponds to publication module 540 of node 500, publish message modifier 640 may pass the modified message to message router 560.

Figure 7:
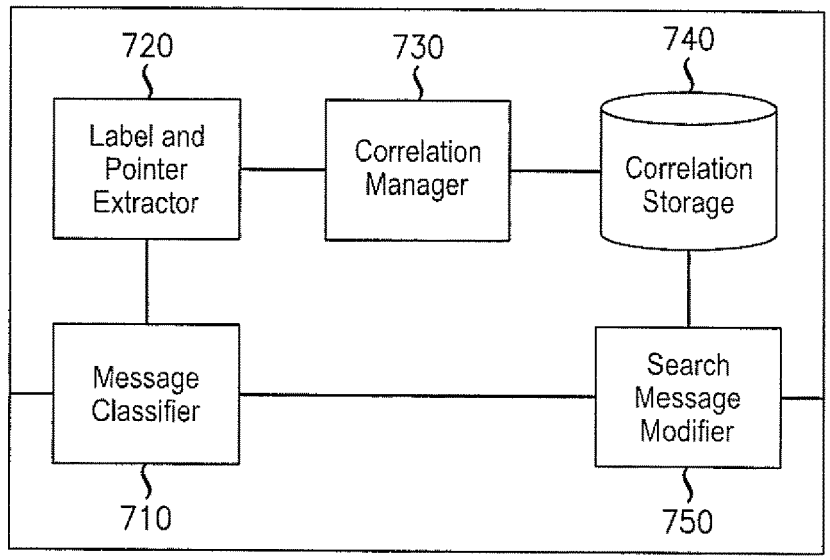
FIG. 7 illustrates an exemplary system for processing received publish messages and resolving search messages.

FIG. 7 illustrates an exemplary system 700 for processing received publish messages and resolving search messages. System 700 may correspond to resolution module 550 of node 500, may be deployed within a different node, or may be deployed as an independent node. System 700 may include message classifier 710, label and pointer extractor 720, correlation manager 730, correlation storage 740, and search message modifier 750.

Message classifier 710 may include hardware and/or executable instructions on a machine-readable storage medium configured to determine a message type for a received message. Message classifier may receive a message from another device or from another component of the node in which system 700 is deployed. In various embodiments wherein system 700 corresponds to resolution module 550 of node 500, message classifier 710 may receive a publish message from message interpreter 520. Message classifier 710 may read at least a portion of the message to determine whether it is a publish message or a search message. For example, message classifier 710 may read a message type field from the message. If the message is a publish message, message classifier 720 may pass the message to label and pointer extractor 720. If, on the other hand, the message is a search message, message classifier may pass the message to search message modifier 750.

Label and pointer extractor 720 may include hardware and/or executable instructions on a machine-readable storage medium configured to extract a label and pointer from a publish message. For example, label and pointer extractor 720 may read data from special label and pointer fields of the publish message. Label and pointer extractor may then pass this information to correlation manager 730.

Correlation manager 730 may include hardware and/or executable instructions on a machine-readable storage medium configured to store a label and pointer pair in correlation storage for later use. In various embodiments, correlation manager 730 may simply store a label and pointer together in a correlation record. In various alternative embodiments, wherein a pointer may be associated with multiple labels (indicating multiple locations for a content item), correlation manager may store a number of labels in each correlation record.

Correlation storage 740 may be any machine-readable medium capable of storing associations between labels and pointers. Accordingly, correlation storage 740 may include a machine-readable storage medium such as read-only memory (ROM), random-access memory (RAM), magnetic disk storage media, optical storage media, flash-memory devices, and/or similar storage media. Such associations between pointers and labels may be, for example, a one-to-one relationship or a one-to-many relationship.

Search message modifier 750 may include hardware and/or executable instructions on a machine-readable storage medium configured to determine an appropriate label for a pointer and subsequently modify a search message to include the label. First, search message modifier 750 may locate a correlation record in correlation storage 740 that is associated with a pointer carried by the search message. Next, search message modifier 750 may read a label from the correlation record. If the correlation record contains multiple labels, search message modifier may select an appropriate label based on, for example, distance to or current load on the server associated with each of the labels. Once search message modifier 750 determines a label to use, search message modifier may insert the label into the message and indicate that the message should be routed based on the label. For example, search message modifier 750 may insert the label into an address field of the message or may insert the label into a special label field of the message and indicate in another field that the label should be used to route the message.

After modifying the message, search message modifier 750 may forward the message to another device or to another component within a node in which system 700 is deployed. In various embodiments wherein system 700 corresponds to resolution module 550 of node 500, search message modifier 750 may pass the modified message to message router 560.

Figure 8:
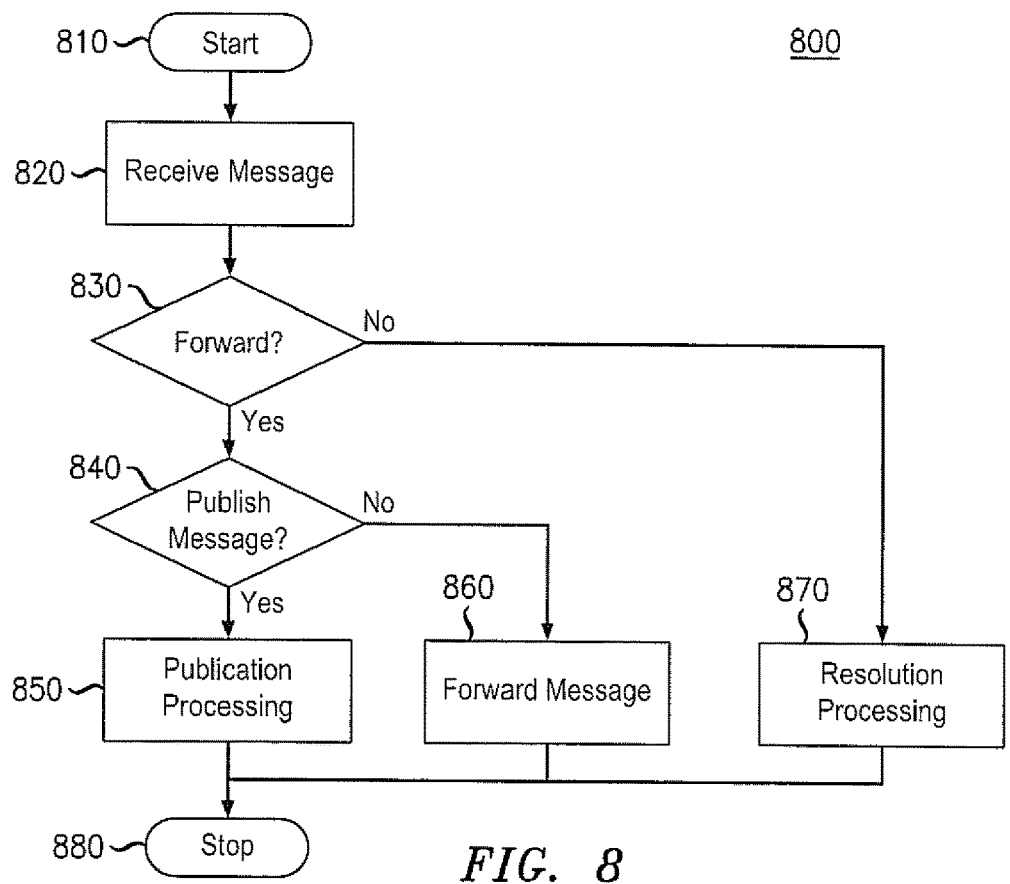
FIG. 8 illustrates an exemplary method for processing content-routed messages.

FIG. 8 illustrates an exemplary method 800 for processing content-routed messages. Method 800 may be performed, for example, by the components of network node 500 such as message interpreter 520, publication module 540, resolution module 550, and/or message router 560.

Method 800 may begin in step 810 and proceed to step 820 where node 500 may receive a message. Then, in step 830, node 500 may determine whether it should forward the received message. In various embodiments, node 500 may determine that the message should be forwarded if it is a response message or if there is a longer prefix match at another known node. If the message should be forwarded, method 800 proceeds to step 840.

At step 840, the node 500 determines whether the message is a publish message by, for example, examining a message type field of the message header. If the message is a publish message, method 800 proceeds to step 850. In step 850, node 500 may perform publication processing with regard to the message. For example, node 500 may calculate a label, insert the label into the publication message, and forward the message to another device. An exemplary method for publication processing will be described in greater detail below with respect to FIG. 9. Method 800 then ends in step 880.

If, on the other hand, node 500 determines at step 840 that the message is not a publish message, method may proceed to step 860. At step 860, node 500 may simply forward the message to another device based on a longest prefix match for a pointer, label, or address that the message indicates should be used for routing purposes. Method 800 then proceeds to end in step 880.

If, at step 830, node 500 determines that the message should not be forwarded as-is, method 800 proceeds to step 870. For example, if node 500 determines that node 500 is the longest prefix match for a pointer being used to route the message, node 500 may determine that the message should not be forwarded in its current state. In step 870, node 500 may perform additional resolution processing with respect to the message. For example, if the message is a publish message, node 500 may store the pointer and label carried by the message for future use. As a further example, if the message is a search message, node 500 may look up a label, insert the label into the message, and forward the message based on the label. An exemplary method for resolution processing will be described in greater detail below with respect to FIG. 10. Method 800 then ends in step 880.

FIG. 9 illustrates an exemplary method 900 for processing and transmitting publish messages. Method 900 may correspond to step 850 of method 800. Method 900 may be performed by the components of system 600 such as pointer extractor 610, label calculator 620, and/or publish message modifier 640.

Method 900 may begin in step 910 and proceed to step 920 where system 600 may determine whether the publish message includes a label already. If the publish message includes a label, then another system has already performed the publisher function. If this is the case, method 900 may skip to step 970. Otherwise, method 900 may proceed to step 930.

In step 930, system 600 extracts a pointer from the publish message. Then, in step 940, system 600 may generate a label. For example, system 600 may combine the pointer and a prefix associated with system 600 to generate a label. Next, in step 950, system 600 may optionally store the label and pointer together in a storage device for later use. In various embodiments, method 900 may not include step 950.

In step 960, system 600 may modify the publish message by, for example, inserting the label into the message. System 600 may then, in step 970, forward the message to another device based on the longest known prefix for the pointer. In various embodiments, step 970 may be performed by a component outside of system 600 such as, for example, message router 560 of node 500. Method 900 may then end in step 980.

FIG. 10 illustrates an exemplary method 1000 for processing received publish messages and resolving search messages. Method 1000 may correspond to step 870 of method 800. Method 1000 may be performed by the components of system 700 such as message classifier 710, label and pointer extractor 720, correlation manager 730, and/or search message modifier 750.

Method 1000 begins in step 1010 and proceeds to step 1020 where system 700 determines whether a received message is a publish message. If the message is a publish message, method 1000 proceeds to step 1030, where system 700 extracts a pointer and label from the message. Subsequently, system 700 stores the pointer and label together in a storage device for later use in step 1040. Method 1000 then proceeds to end in step 1090.

If however, at step 1050, system 700 determines that the received message is not a publish message, method 1000 proceeds instead to step 1050. Alternatively, system 700 may ensure that the received message is a search message before proceeding to step 1050. In step 1050, system 700 extracts a pointer from the received message. Next, in step 1060, system 700 looks up a previously stored label for the extracted pointer. Once such a label is located, method 1000 proceeds to step 1070 where system 700 modifies the received message. For example, system 700 may insert the label into the message and indicate that the message should be routed based on the label rather than the pointer from this point forward. Then, in step 1080, system 700 may forward the message to another device based on the longest known prefix for the label. In various embodiments, step 1080 may be performed by a component outside of system 700 such as, for example, message router 560 of node 500. Method 1000 may then end in step 1090.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A non-transitory machine-readable storage medium encoded with instructions for requesting content in a network by a computer, the machine-readable storage medium comprising:
   instructions for determining a content item to request;
   instructions for determining a pointer associated with the content item, wherein the pointer is not dependent on a location of the content item;
   instructions for generating a request message including the pointer, comprising instructions for inserting the pointer into the request message as a destination address;
   instructions for transmitting the request message to at least one network node; and
   instructions for receiving the content item from at least one network node.

2. The non-transitory machine-readable storage medium of claim 1, wherein the instructions for determining a pointer associated with the content item comprise instructions for generating a pointer based on the content item.

3. The non-transitory machine-readable storage medium of claim 2, wherein the instructions for generating a pointer based on the content item comprise instructions for generating a hash value based on the content item.

4. The non-transitory machine-readable storage medium of claim 3, wherein the instructions for generating a hash value based on the content item comprise instructions for generating a hash value based on a name of the content item.

5. A non-transitory machine-readable storage medium encoded with instructions for publishing content in a network by a computer, the machine-readable storage medium comprising:
   instructions for determining a content item to publish;
   instructions for generating a pointer based on the content item, wherein the pointer is generated without regard for a location of the content item;
   instructions for generating a publish message including the pointer; and
   instructions for transmitting the publish message to at least one network node.

6. The non-transitory machine-readable storage medium of claim 5, further comprising:
   instructions for receiving a request message from at least one network node, the request message including the pointer and indicating a requesting device;
   instructions for determining that the pointer is associated with the content item; and
   instructions for transmitting the content item to the requesting device.

7. The non-transitory machine-readable storage medium of claim 6, wherein the pointer is included in an address field of the request message.

8. The non-transitory machine-readable storage medium of claim 5, wherein the instructions for generating a pointer based on the content item comprise instructions for generating a hash value based on the content item.

9. The non-transitory machine-readable storage medium of claim 8, wherein the instructions for generating a hash value based on the content item comprise instructions for generating a hash value based on a name of the content item.

10. A method for routing content requests in a network by a network node, the method comprising:
   receiving, at the network node, a request message that requests a content item, the request message including a pointer, wherein the pointer is not dependent on a location of the content item;
   determining whether the network node is associated with the pointer; and
   if the network node is associated with the pointer:
      determining a label associated with the pointer,
      modifying the request message to produce a modified message, the modified message including the label, and
      transmitting the modified message to at least one other network node.

11. The method of claim 10, wherein the step of determining whether the network node is associated with the pointer comprises:
   determining a prefix associated with the network node; and
   determining whether the prefix matches at least a portion of the pointer.

12. The method of claim 11, wherein the step of determining whether the network node is associated with the pointer further comprises determining whether the prefix is a longest matching prefix for the pointer in the network.

13. The method of claim 10, wherein the pointer is included in an address field of the request message and the label is included in an address field of the modified message.

14. The method of claim 10, wherein at least one of the request message and the modified message is a network-layer packet.

15. The method of claim 10, wherein the step of transmitting the modified message to at least one other network node comprises transmitting the modified message toward a different node associated with a different prefix, wherein the different prefix matches at least a portion of the label.

16. The method of claim 10, wherein:
   the pointer is associated with a plurality of labels; and
   the step of determining a label associated with the pointer comprises selecting a label of the plurality of labels.

17. The method of claim 10, further comprising:
   receiving, at the network node, a publication message, the publication message including a pointer and a label;
   extracting the pointer and the label from the publication message; and
   retaining the pointer and the label together in memory;
   wherein the step of determining a label associated with the pointer comprises reading the pointer and label from memory.

18. The method of claim 10, wherein the pointer is a hash of a name for a content item.

19. A resolution system for routing content requests in a network, the resolution system comprising:
   a routing table for storing routing information;
   a correlation storage for storing a plurality of correlation records, wherein each correlation record identifies a pointer and at least one label;
   a receiver interface for receiving a request message that requests a content item, the request message including a requested pointer, wherein the requested pointer is not dependent on a location of the content item;
   a transmitter interface for transmitting messages;
   a search message modifier for:
      locating a correlation record that identifies the requested pointer,
      selecting a selected label of the at least one label identified by the correlation record, and
      modifying the request message to produce a modified message, the modified message including the selected label; and
   a message router for:
      determining, based on the routing information and the modified message, a network node, and
      forwarding the modified message to the network node via the transmitter interface.

20. The resolution system of claim 19, further comprising a message interpreter configured to:
   determine a prefix associated with the resolution system; and
   determine whether the prefix matches at least a portion of the requested pointer.

21. The resolution system of claim 20, wherein, in determining whether the network node is associated with the pointer, the message interpreter is configured to determine whether the prefix is a longest matching prefix for the requested pointer in the network.

22. The resolution system of claim 19, wherein the requested pointer is included in an address field of the request message and the label is included in an address field of the modified message.

23. The resolution system of claim 19, wherein at least one of the request message and the modified message is a network-layer packet.

24. The resolution system of claim 19, wherein, in forwarding the modified message to the network node, the message router is configured to transmit the modified message toward a different node associated with a different prefix, wherein the different prefix matches at least a portion of the selected label.

25. The resolution system of claim 19, wherein:
   the requested pointer is associated with a plurality of labels; and
   in selecting a selected label, the search message modifier is configured to select a label of the plurality of labels.

26. The resolution system of claim 19, wherein:
   the receiver interface is further adapted to receive, a publication message, the publication message including a pointer and a label; and
   the resolution system further comprises a resolution module configured to:
      extract the pointer and the label from the publication message; and store the pointer and the label together in the correlation storage.

27. The resolution system of claim 19, wherein the requested pointer is a hash of a name for a content item.

28. A non-transitory machine-readable storage medium encoded with instructions for routing content requests in a network by a network node, the machine-readable storage medium comprising:
  instructions for receiving, at the network node, a request message that requests a content item, the request message including a pointer, wherein the pointer is not dependent on a location of the content item;
  instructions for determining whether the network node is associated with the pointer; and
  instructions for, if the network node is associated with the pointer:
    determining a label associated with the pointer,
    modifying the request message to produce a modified message, the modified message including the label, and
    transmitting the modified message to at least one other network node.

29. The non-transitory machine-readable storage medium of claim 28, wherein the instructions for determining whether the network node is associated with the pointer comprise:
  instructions for determining a prefix associated with the network node; and
  instructions for determining whether the prefix matches at least a portion of the pointer.

30. The non-transitory machine-readable storage medium of claim 29, wherein the instructions for determining whether the network node is associated with the pointer further comprise instructions for determining whether the prefix is a longest matching prefix for the pointer in the network.

31. The non-transitory machine-readable storage medium of claim 29, wherein at least one of the request message and the modified message is a network-layer packet.

32. The non-transitory machine-readable storage medium of claim 28, wherein the pointer is included in an address field of the request message and the label is included in an address field of the modified message.

33. The non-transitory machine-readable storage medium of claim 28, wherein the instructions for transmitting the modified message to at least one other network node comprise instructions for transmitting the modified message toward a different node associated with a different prefix, wherein the different prefix matches at least a portion of the label.

34. The non-transitory machine-readable storage medium of claim 28, wherein:
  the pointer is associated with a plurality of labels; and
  instructions for determining a label associated with the pointer comprise instructions for selecting a label of the plurality of labels.

35. The non-transitory machine-readable storage medium of claim 28, further comprising:
  instructions for receiving, at the network node, a publication message, the publication message including a pointer and a label;
  instructions for extracting the pointer and the label from the publication message; and
  instructions for retaining the pointer and the label together in memory;
  instructions for wherein the step of determining a label associated with the pointer comprises reading the pointer and label from memory.

36. The non-transitory machine-readable storage medium of claim 28, wherein the pointer is a hash of a name for a content item.

37. A method for publishing content in a network by a network node, the method comprising:
  receiving, at the network node, a publish message regarding a content item, wherein the publish message includes a pointer, wherein the pointer is not dependent on a location of the content item;
  generating a label to be associated with the pointer;
  modifying the publish message to produce a modified message, wherein the modified message includes the label; and
  transmitting the modified message to at least one other network node.

38. The method of claim 37, wherein the step of generating a label to be associated with the pointer comprises:
  determining a prefix associated with the network node; and
  including at least a portion of the pointer and at least a portion of the prefix in the label.

39. The method of claim 37, wherein the pointer is included in an address field of at least one of the publish message and the modified message.

40. The method of claim 37, wherein the step of transmitting the modified message to at least one other network node comprises selecting the at least one other network node based on the pointer.

41. The method of claim 40, wherein the step of selecting the at least one other network node based on the pointer comprises:
  determining a prefix associated with the at least one other node; and
  determining that the prefix matches at least a portion of the pointer.

42. The method of claim 37, wherein the pointer is a hash of a name for a content item.

43. The method of claim 37, wherein at least one of the publish message and the modified message are network layer packets.

44. A publication system for publishing content in a network, the publication system comprising:
  a routing table for storing routing information;
  a receiver interface for receiving a publish message regarding a content item, the publish message including a pointer, wherein the pointer is not dependent on a location of the content item;
  a transmitter interface for transmitting messages;
  a label calculator for generating a label for association with the pointer;
  a publish message modifier for modifying the publish message to produce a modified message, wherein the modified message includes the label; and
  a message router for:
    determining, based on the routing information and the modified message, a network node; and
    forwarding the modified message to the network node via the transmitter interface.

45. The publication system of claim 44, wherein, in generating a label for association with the pointer, the label calculator is configured to:
  determine a prefix associated with the network node; and
  include at least a portion of the pointer and at least a portion of the prefix in the label.

46. The publication system of claim 44, wherein the pointer is included in an address field of at least one of the publish message and the modified message.

47. The publication system of claim 44, wherein, in forwarding the modified message to the network node, the message router is configured to select the network node based on the pointer.

48. The publication system of claim 47, wherein, in selecting the network node based on the pointer, the message router is configured to:
  determine a prefix associated with the network node; and
  determine that the prefix matches at least a portion of the pointer.

49. The publication system of claim 44, wherein the pointer is a hash of a name for a content item.

50. The publication system of claim 44, wherein at least one of the publish message and the modified message are network layer packets.

51. A non-transitory machine-readable storage medium encoded with instructions for publishing content in a network by a network node, the machine-readable storage medium comprising:
  instructions for receiving, at the network node, a publish message regarding a content item, wherein the publish message includes a pointer, wherein the pointer is not dependent on a location of the content item;
  instructions for generating a label to be associated with the pointer;
  instructions for modifying the publish message to produce a modified message, wherein the modified message includes the label; and
  instructions for transmitting the modified message to at least one other network node.

52. The non-transitory machine-readable storage medium of claim 51, wherein the instructions for generating a label to be associated with the pointer comprise:
  instructions for determining a prefix associated with the network node; and
  instructions for including at least a portion of the pointer and at least a portion of the prefix in the label.

53. The non-transitory machine-readable storage medium of claim 51, wherein the pointer is included in an address field of at least one of the publish message and the modified message.

54. The non-transitory machine-readable storage medium of claim 51, wherein the instructions for transmitting the modified message to at least one other network node comprise instructions for selecting the at least one other network node based on the pointer.

55. The non-transitory machine-readable storage medium of claim 54, wherein the instructions for selecting the at least one other network node based on the pointer comprise:
  instructions for determining a prefix associated with the at least one other node; and
  instructions for determining that the prefix matches at least a portion of the pointer.

56. The non-transitory machine-readable storage medium of claim 51, wherein the pointer is a hash of a name for a content item.

57. The non-transitory machine-readable storage medium of claim 51, wherein at least one of the publish message and the modified message are network layer packets.

* * * * *